Nov. 13, 1956     O. H. SCHUCK ET AL     2,770,429
AUTOMATIC CONTROL SYSTEMS
Filed Sept. 17, 1951

Inventor
OSCAR HUGO SCHUCK
BENJAMIN H. CISCEL

By George H. Fisher
Attorney

United States Patent Office 2,770,429
Patented Nov. 13, 1956

2,770,429

AUTOMATIC CONTROL SYSTEMS

Oscar Hugo Schuck, Minneapolis, and Benjamin H. Ciscel, Minnetonka Mills, Minn., assignors to Minneapolis-Honeywell Regulator Company, Minneapolis, Minn., a corporation of Delaware Application September 17, 1951, Serial No. 246,964

12 Claims. (Cl. 244—77)

This invention pertains to automatic control systems for operating a control surface such as an elevator to return the craft to a predetermined attitude after departure therefrom. The aircraft as thus equipped may be likened to a vibratory system with the control surface operable to provide system stiffness to attitude changes.

Control systems of this type have been proposed wherein the amount of control surface displacement, to automatically correct for a given change in attitude of an aircraft, varies with airspeed to somewhat maintain system stiffness constant. This change in control surface displacement with airspeed has been effected in a balanceable or proportional system as in the patent to Isserstedt 2,387,795 by a ratio control which provides for a rebalance of the system with less control surface movement. Other systems utilize the reactive force on the control surface as a means for limiting its displacement with airspeed. In this manner the turning moment of the elevator on the aircraft has been maintained substantially the same for a given departure in attitude over a considerable range of airspeeds in an effort to maintain system stiffness where restoring effort is proportional to unbalance.

This modification or correction of elevator displacement alone in accordance with reactive force, however, is not sufficient to maintain the stiffness of the system substantially constant over a range of airspeeds in all circumstances concerning the craft. Data on some aircraft indicates that the required stick force or control surface reactive force to oppose a given change in attitude from an external disturbance decreases with rearward motion of the center of gravity and this cause of reactive force variation is therefore also involved along with airspeed in positioning the elevator to maintain stiffness.

A displaced elevator causes an acceleration of the aircraft and consequently places an abnormal stress on the aircraft structure. It is desirable to limit the acceleration in order not to overstress the craft. Varying elevator displacement with airspeed or reactive force tends to limit acceleration.

If we assume that the aircraft in pitch rotates about the lateral axis through the center of gravity, the aircraft is stabilized about this axis by the opposing actions of moment of the upwardly directed lift force and the moment of the downwardly directed force on the tail surface. Movement of the center of gravity rearwardly reduces the lift moment more rapidly than the tail moment. With the center of gravity at the position of the lift vector, it is apparent that very little force on the elevator can change the attitude of the craft and therefore accelerate parts thereof and this apparently accounts for the reduction of stick force with rearward movement of the center of gravity.

It is thus evident that if the optimum dynamic stability or stiffness is to be obtained or if the acceleration is to be limited the elevator displacement must be corrected not only for change in air speed but also for change in position of the center of gravity.

While the airspeed and position of the center of gravity as pointed out affect the dynamic stability of the aircraft they also affect the steady state conditions of the craft, i. e., when it is not accelerating. Data on some aircraft further indicates that if the craft is to be maintained in a constant rate of climb or constant rate of descent, the position of the elevator must be varied in accordance with these factors of airspeed and the position of the center of gravity.

An object of this invention is to provide an automatic control system for operating a control surface of an aircraft wherein the position of the control surface due to an operation initiation signal is modified in accordance with variations in airspeed and the position of the center of gravity to obtain optimum dynamic stability of said aircraft.

A further object of this invention is to vary the position of the control surface in said system while said aircraft is at zero normal deviation acceleration, i. e., when in a constant rate of climb or constant rate of descent, in accordance with airspeed and position of the center of gravity of said aircraft.

The above provisions satisfy the general requirements to a reasonable degree and thus maintains system stiffness. However, various errors (due to the approximations used, practical tolerances, and possible changes in aircraft characteristics due to altitude, and even damage) make it unadvisable to depend on such open-cycle computed control where control signals are modified by change in airspeed and center of gravity position for safeguarding the aircraft against structural failure due to excessive accelerations. It is, therefore, desirable to "close the loop" or exert an over-all supervisory control through the introduction of the quantity actually of prime interest, the normal acceleration.

It is a further object of this invention therefore to provide such control system with a supervisory accelerometer control.

Other features of the invention will appear from a consideration of the following description taken in conjunction with the accompanying drawing wherein:

Figure 1 is a schematic view of a control system embodying the invention wherein alternating current control devices are utilized.

Figure 2 is a schematic illustration of a control system embodying the invention and utilizing direct current control devices.

Figure 3 is a plot of data illustrating the accelerations normal to the roll and pitch axes of a particular craft for various elevator positions as affected by airspeed and the position of the center of gravity of the aircraft; such plots may vary for different types of aircraft.

Figure 4 is a plot of data for a particular aircraft indicating the position of the elevator for zero deviation from the normal acceleration as determined by airspeed and the position of the center of gravity of the aircraft.

Referring to Figure 1, the control system illustrated therein includes cables 10 extending from a servomotor drum 11 which cables are adapted to position the elevator (not shown) of the aircraft. The cable drum 11 is supported on the shaft 12 of a servomotor 13. The servomotor is reversibly controlled through an energized engage elevator relay 14 from an elevator amplifier 15.

The operation of the elevator amplifier 15 is controlled by a balanceable potentiometric or variable impedance network 20. The amplifier 15 is of the discriminator type and effects rotation of the motor 13 in one direction or another depending upon the phase relationship of the voltage obtained from the network 20 with respect to a supply voltage to the amplifier 15. The system thus far is similar to that disclosed in the patent to Hamby 2,466,702, Figure 5.

The balanceable network 20 consists of two sub-networks 21 and 22. The components of sub-network 21 comprise a follow-up network 24, a center of gravity trim and airspeed trim network 33, and an airspeed ratio potentiometer 51. The details of these components may now be considered. Network 24 comprises a servomotor potentiometer 25 having a slider 26 and a resistor 27 and a transformer 28 having a primary winding 29 and a secondary winding 30. The resistor 27 is connected across the ends of secondary winding 30. The slider 26 is positioned from the output shaft 12 of the servomotor 13 through a suitable operating connection 31 in accordance with servomotor position. A lead wire 32 extends from slider 26 to a control electrode of amplifier 15. Since in the several networks to be described, a single primary winding may be used to supply a multiple of secondary windings, the primary winding in the transformer will be common to the several networks.

Network 33 comprises a center of gravity trim potentiometer 34 having a slider 36 and resistor 35 which is connected across a secondary winding 38 of transformer 28 and an airspeed trim potentiometer 39 having a resistor 40 connected across the secondary winding 38 and a slider 41. The slider 36 is operated by a suitable connection 42 extending from a center of gravity computer 43. A lead wire 44 extends from a center tap of secondary winding 30 of network 24 to slider 36. An airspeed responsive device 50 through a suitable operating connection 47 positions the slider 41. The airspeed ratio potentiometer comprises a slider 52 and a resistor 53. One end of resistor 53 is connected by a lead wire 55 to slider 41 and the opposite end of resistor 53 is connected by a lead wire 54 to slider 26 of potentiometer 25. The slider 52 is positioned from an airspeed responsive device 57 through a suitable operating connection 56.

Sub-network 22 comprises a pitch rate network 59, an aircraft acceleration network 66, a selected attitude and pitch deviation network 79, and a center of gravity ratio potentiometer 90. Network 59 comprises a pitch rate potentiometer 60 having a resistor 61 connected across a secondary winding 63 of the transformer and a slider 62. Slider 62 is positioned in accordance with the rate of pitch of the aircraft through a suitable operating connection 64 from a pitch rate gyroscope 65. Network 66 comprises an acceleration potentiometer 67 having a slider 68 and resistor 69 which is connected across the ends of a secondary winding 73 of the transformer. Resistor 69 is provided with two adjustable connected taps 71, 72 between which is positioned the slider 68 whereby a variable width dead spot is obtained. An accelerometer 74 positions the slider 68 through a suitable operating connection 75. A lead wire 76 extends from the slider 68 to a center tap of secondary winding 63 of network 59. Network 79 comprises a manually controlled pitch attitude selector potentiometer 80 having a resistor 81 and a slider 82, the resistor 81 being connected across the ends of a secondary winding 86 of the transformer 28. The network additionally includes a pitch attitude potentiometer 83 having a resistor 84 and a slider 85, the resistor 84 being connected across the ends of secondary winding 86. Slider 82 may be manually positioned to select a desired attitude of the craft. A lead wire 87 extends from slider 82 to the broad center tap of potentiometer 67. Slider 85 is positioned through an operating connection 88 from a vertical gyroscope 89. Slider 85 is connected to ground. Ratio potentiometer 90 comprises a resistor 91 and a slider 92. One end of resistor 91 is connected by lead wire 93 to slider 62 of network 59 and the opposite end of resistor 91 is connected by lead wire 94 to the slider 85 of potentiometer 83. A lead wire 95 extends from slider 92 to slider 52 of potentiometer 51. The slider 92 is positioned from a center of gravity computer 98. The second control electrode of amplifier 15 is connected by lead 96 to ground which is common to the ground of slider 85 and it is thus evident that the two control electrodes of amplifier 15 are connected to the variable impedance network 20 which supplies control signals thereto.

The center of gravity computers 43 and 98 are the type which compute the center of gravity of the aircraft while in flight and while in general these computers position the pointer of an indicator they may be readily adapted to position the slider 36 of potentiometer 34 and the slider 92 of potentiometer 90. A suitable type of center of gravity computer is disclosed in the patent to Dean 2,443,098. In Figure 1 of the patent to Dean, a motor 39 rotates in proportion to the summation of the moments and a motor 35 operates in accordance with the weight. The movements of these motors are applied to a dividing mechanism 40 with the resultant movement being applied to a center of gravity indicator 41. This resultant movement or output of dividing mechanism 40 may be used to adjust slider 36 of potentiometer 34 and slider 92 of potentiometer 90 in accordance with the position of the center of gravity of the aircraft.

The airspeed responsive device 50 positions a slider 41 in accordance with the Mach number of the speed of the aircraft but for simplification of illustration comprises a casing 100 within which is supported a bellows 101. Static pressure is applied to the exterior of the bellows by a suitable connection 102 to casing 100 and dynamic air pressure is supplied through a line 103 to the interior of the bellows 101. The differential air pressure causes the movement of the bellows which movement is communicated to operating mechanism for slider 41 comprising a suitable cam shaped member 104 and a follower 47. The contouring of cam 104 will be brought out in the discussion of Figure 4.

The airspeed responsive device 57 is similar to the airspeed responsive device 50 but with the pressure connections reversed and with the exception that linear movements of the bellows effect linear movements of the slider 52 by an operating connection 56.

The rate gyroscope 65 is of the well known type having freedom of rotation about one axis and having its rotation about a second axis restrained. An example of such gyroscope is shown in the patent to Thiry 2,190,390. In that patent the gyroscope $T_k$ is responsive to the rate of roll of the aircraft. In the present application of such gyroscope, the rate gyroscope is so mounted on the aircraft as to be responsive to the rate of pitch of the aircraft and the response of such gyroscope is communicated to the slider 62.

The accelerometer 74 which is responsive to the normal acceleration of the aircraft, i. e., perpendicular to the roll and pitch axis, is preferably of the type not responsive to the angular movements of the aircraft about the pitch axis. A suitable type of accelerometer is disclosed in the patent to Wimperis 982,336. In utilizing the structure in the Wimperis patent, the index $p$ would be replaced by the slider 68 of potentiometer 67. The accelerometer would be mounted in the aircraft to measure the normal acceleration and would thus have the arbors $e$ and $k$ parallel with the pitch axis and additionally the plane containing the arbors $e$, $k$, and the center of gravity of disk $b$ and mass $m$ parallel with the pitch axis. While this accelerometer may be mounted near the center of gravity of the aircraft, it is preferably mounted adjacent a part of the aircraft which is to have applied thereto the lowest number of "G's" accelerations.

The vertical gyroscope 89 is of the conventional type having three degrees of angular freedom with the spin axis of the rotor maintained perpendicular to the surface of the earth. Such gyroscopes are well known, an illustration being shown in the patent to Thiry 2,190,390. The vertical gyroscope $K$ in Thiry is of the aforementioned type. The gyroscope 89 is so mounted on the aircraft that upon movement of the aircraft about the pitch axis the slider 85 is moved with respect to resistor 84 in accordance with the angular pitch movement.

In Figure 1, there has been illustrated a control circuit 20 based on a series summing of A. C. voltages. Figure 2 is an arrangement similar to Figure 1 wherein the control circuit is based on parallel summing of D. C. voltages. In Figure 2 we have the servomotor 13a and the amplifier 15a corresponding with servomotor 13 and amplifier 15 of Figure 1. The control circuit 20a of Figure 2 comprises sub-networks 21a and 22a. The sub-network 21a comprises the servomotor balance potentiometer 25a, the center of gravity potentiometer 34a, and the airspeed potentiometer 39a. It is evident that this sub-network 21a is similar to network 21 in Figure 1. However, instead of using a single airspeed ratio potentiometer a double ratio potentiometer 51a is required in network 21a. The potentiometers are energized from a D. C. source such as battery 101 having a grounded center tap. Similarly, in sub-network 22a there is an accelerometer potentiometer 67a, a pitch rate potentiometer 60a, a pitch attitude selector potentiometer 80a, and a pitch attitude potentiometer 83a. Sub-network 22a also requires a double center of gravity ratio potentiometer 90a. The parallel network arrangement provides for the summation of the signals from the various individual potentiometers. A signal is derived by adjusting a potentiometer slider along its resistor in either direction from the midpoint thereof. The midpoint potential is the same as the grounded center tap of battery 101. The slider potential polarity varies with respect to the resistor center potential in accordance with the direction the slider is moved from center. This potential difference is applied through the summing resistors extending from the sliders to the summing network. This resultant D. C. signal voltage is applied to a vibrator 102 and thereby converted to alternating current which is suitable to operate the amplifier 15a.

One of the advantages of the D. C. circuit is the possibility of introducing frequency corrective networks in any of the component circuits. One corrective network in particular might be a resistance-capacitor lead network as 14 in Hull 2,317,383 in the accelerometer circuit to start correction earlier when the acceleration is approaching the safe limit. Another is the possibility of correcting for discrepancies in the trim correction by using an integral network, as made up by capacitor and resistance elements or assuming other appropriate constructions, in the elevator displacement feedback.

Figure 3 shows the variations in the position of the elevator for various airspeeds and positions of the center of gravity in order to maintain a constant normal acceleration. In the present illustration the normal acceleration is three G's. This normal acceleration as stated previously is perpendicular to the direction of the roll and pitch axes. The three G's acceleration is the acceleration above the normal gravitational acceleration. Figure 3 indicates that as airspeed increases less elevator is required to provide the same acceleration and likewise as the center of gravity moves rearwardly less elevator displacement is required for the same acceleration. In Figure 3, the positions of the center of gravity have been taken along the mean aerodynamic chord of the wing (M. A. C.) of the aircraft from front toward the trailing edge of the wing.

Figure 4 shows the relationship of the elevator surface for various airspeeds and positions of the center of gravity while the aircraft has zero normal acceleration where the acceleration is measured above the constant gravitational acceleration. In Figure 4 the positions of the center of gravity are related to the mean aerodynamic chord of the aircraft.

Returning to Figure 1, it will now be apparent why the cam member 104 of the airspeed device 50 of Figure 1 has a particular contour. The cam 104 is contoured similar to the solid line curve of Figure 4. This curve indicates that for airspeeds below .46 Mach number the elevator should be depressed; between speeds of .46 and .78 Mach numbers the elevator should be raised; and above airspeeds of .78 Mach number the elevator should again be depressed.

Concerning the operation of the structure in Figure 1, it will be apparent that when the sliders 26, 36, 41, 62, 68, 82, and 85 are at the mid positions of their respective resistors that they are all of like potential and that there is no control signal applied across the control electrodes of amplifier 15. Further, if slider 82 is manually displaced from its mid position, its potential with respect to slider 85 changes. This difference of potential between sliders 82 and 85 is applied across the voltage dividing potentiometer 90 and a portion thereof as selected by the position of slider 92 is applied through network 21 to one electrode of amplifier 15 whereby its potential is altered with respect to the other control electrode. The amplifier 15 thereupon operates and causes the servomotor 13 to position the slider 26 of the servomotor potentiometer 25 to balance the input network 20. In a similar manner, the other sliders of the control potentiometers may be adjusted by their operating means to control the operation of the amplifier 15 and servomotor 13.

The arrangement in Figure 1 may be set up based on airspeed of .46 Mach number and the center of gravity at 15% M. A. C. The vertical gyro slider 85, the attitude selector slider 82, the rate gyro slider 62, may be placed at the centers of their electrical resistors. The elevator may be adjusted to approximately 12 degrees up to correspond with .46 Mach number of Figure 3. With the center of gravity computed at 15% M. A. C., the slider 36 is placed at the center of its resistor 35. With the airspeed device 50 at pressures corresponding to .46 Mach, the slider 41 is centered with respect to its resistor 40 with the follower 47 engaging cam 104. With the accelerometer 74 at a position corresponding to three G's slider 68 is centered with respect to its resistor 67. The slider 52 of potentiometer 51 is positioned so that it will cover the required range of speeds, and with the airspeed device 57 at a position corresponding to .46 Mach number, the slider 52 is connected to its operating means 56. The slider 92 is now adjusted until the amplifier input is balanced with the elevator displaced approximately 12 degrees upward as stated. With the center of gravity computer 98 set for the center of gravity at 15% M. A. C. the slider 92 is connected thereto.

The adjustable taps 71 and 72 of the accelerometer potentiometer 67 may be adjusted so that no signal is obtained from this potentiometer until the maximum allowable acceleration is approached.

The manually operable attitude selector 82 may be returned to its center position whereupon the servomotor 13 is oppositely controlled so that the control surface is moved back to its normal position.

After the apparatus of Figure 1 is set up as described, subsequent operation thereof during flight conditions may be readily understood by referring to Figures 3 and 4. With the aircraft airborne and at an airspeed of .46 Mach number and center of gravity at 15% M. A. C., the elevator is in streamline position as indicated in Figure 4. At this time the aircraft is in straight and level flight at a selected attitude and there is no unbalance voltage in sub-network 22. Should the position of the center of gravity move rearwardly, slider 36 is moved by the C. G. computer 43 toward the right so that the amplifier causes the motor 13 to position the elevator upwardly as indicated in Figure 4.

Should the airspeed vary while the center of gravity is at 15% M. A. C., the airspeed device 50 will move the cam 104 in either direction depending upon whether the airspeed decreases or increases. If the speed decreases, bellows 101 contracts and moves the cam 104 downward in the figure thereby causing the slider 41 of potentiometer 39 to move leftwardly. This leftward movement causes a lowering of the elevator in conformance with the relationship of airspeed and elevator position shown in Figure 4. Likewise if the airspeed increases the pressure within bellows 101 increases and the bellows expands moving the cam 104 upwardly. The follower 47 thereby causes slider 41 to move to the right effecting upward movement of the elevator. It is apparent that when the airspeed reaches a predetermined value approximately .78 Mach number the elevator will have been returned to its zero position as provided by cam 104.

The operation may be considered during dynamic stabilization of the aircraft on a selected attitude. Again assuming the aircraft at a speed of .46 Mach number and center of gravity at 15% M. A. C. with no unbalance signal in sub-network 21 and no unbalance signal in sub-network 22. Should the aircraft undergo a transient disturbance and move about the pitch axis, the vertical gyroscope 89 and the pitch rate gyroscope 65 respond to this pitch movement. The sub-network 22 now has an unbalance signal which is applied through network 21 to amplifier 15. Amplifier 15 in response to this unbalance signal operates servomotor 13 which positions the elevator and its follow up potentiometer slider 26. Slider 26 moves until the entire network 20 is balanced. If the accelerometer potentiometer taps 71 and 72 have been adjusted until no signal is obtained from this potentiometer until three G's acceleration is exceeded the elevator for the assumed airspeed and position of center of gravity may, if the transient be rapid in character, reach a maximum position of approximately fifteen degrees upward, as indicated in Figure 3. Should the airspeed increase, say about .6 Mach number, the airspeed device 57 will move slider 52 toward the left whereby a greater portion of the voltage from the servomotor potentiometer 25 is utilized in network 20 and thereby requiring less displacement of servomotor 13 and the elevator from their normal position.

Should the center of gravity move rearwardly, the C. G. computer 98 moves the slider 92 towards the right. Thus a smaller portion of the voltage derived from the rate potentiometer 60 and the pitch angle potentiometer 83 is utilized in network 20. Consequently, less control surface movement is required in order that the servomotor 13 positions the slider 26 to balance the signal from the C. G. ratio potentiometer 90.

If at any time the acceleration limit is exceeded, the accelerometer 74 adjusts the slider 68 of potentiometer 67 to put in a signal modifying the displacement of the elevator so that the normal acceleration is held within the allowable limit.

The supervisory function of the accelerometer 74 is evident when an actual condition is considered. With the aircraft at .46 Mach number and center of gravity at 15% M. A. C. should the pilot move slider 82 to cause the aircraft to nose downwardly about the pitch axis, the solid line curve in Figure 3 indicates that in order to avoid exceeding 3 G normal acceleration the elevator displacement should not be above approximately 13 degrees downward. If the elevator is now displaced a greater extent than is allowable for the safe acceleration, the accelerometer 74 exerts a controlling effect to cause modification in the position of the elevator to maintain the normal acceleration within the desired limit. The same limiting action will be obtained if the normal acceleration is caused by response of the control system to exterior forces on the aircraft.

It will now be appreciated that there has been provided a novel automatic control system for an aircraft wherein the system functions, on the application of exterior forces or pilot control to change the attitude of the aircraft, to operate the control system to retain a selected attitude which operation of the control surface to correct for the disturbance is modified in accordance with the airspeed of the aircraft and with the change in the position of the center of gravity of the aircraft. Furthermore, said system includes features for modifying the position of the elevator in accordance with change in airspeed and change in the position of the center of gravity to maintain zero normal acceleration of said aircraft. Finally said system includes an accelerometer control for exerting a supervisory authority when the features for maintaining zero normal acceleration are opposed to those for stabilizing the aircraft.

As the invention may assume widely different embodiments, it is desired that the invention be not limited to the particular arrangement disclosed but be defined by the accompanying claims.

We claim as our invention:

1. Control apparatus for an aircraft having an elevator control surface having a normal position, said apparatus comprising: position maintaining means for producing a voltage varying in magnitude in response to extent of variations in attitude of said craft about an axis thereof; a servomotor adapted to operate said elevator and also producing a voltage varying in magnitude in response to extent of movements thereof; means responsive to said voltages and connected to the servomotor for controlling said servomotor in accordance with the relative magnitude of said voltages to maintain the attitude; and center of gravity computer and speed responsive means for producing a voltage varying in accordance with the position of the center of gravity of said aircraft and the airspeed of said aircraft and connected to said responsive means and effective on said servomotor to alter the normal relative positions of said attitude responsive means and said control surface.

2. Control apparatus for an aircraft comprising: a servomotor adapted to control the attitude of said aircraft about an axis; attitude sensing means movable in accordance with tilt about an axis; movable attitude selector means; balanceable control means responsive to said attitude sensing and selector means for operating said servomotor in accordance with the relative extent of movement of said attitude sensing means and said selector means; and further means responsive to the longitudinal change in position of the center of gravity of said aircraft and connected to said control means for changing the operation of said servomotor for any given difference in extents of movements of said attitude means and said movable attitude selector means.

3. Control apparatus for an aircraft having an elevator control surface having a normal position, said apparatus comprising: attitude sensing means for producing a signal voltage in accordance with the extent of craft tilt about one axis; a servomotor adapted to position said elevator and to produce a signal voltage in proportion to its extent of movement; balanceable control means supplied with said signals and responsive to the relative magnitude of said signal voltages for operably controlling the extent of operation of said servomotor to stabilize craft attitude; and further means for producing a signal voltage in accordance with the change in longitudinal position of the center of gravity of said aircraft and adapted to additionally operate said control means to vary the normal elevator position to maintain the attitude of said craft.

4. Control apparatus for an aircraft having an elevator control surface having a normal position, said apparatus comprising: attitude responsive means for providing an alternating signal voltage corresponding in phase and magnitude to the relative position of said attitude responsive means and craft; servo means adapted to operate said elevator from normal position and to provide an alternating signal voltage varying in phase and magnitude with the change in position of said servomotor; balanceable control means responsive to the difference of said voltages for controlling the change in position of said servomotor; whereby said aircraft is maintained in a predetermined attitude despite transient disturbances; and further means responsive to the change in longitudinal position of the center of gravity of said aircraft for producing a voltage variable in phase and magnitude in accordance with such change in center of gravity position; and means for operating said control means in accordance with such voltage due to the change in the position of the center of gravity whereby to alter the normal position of said elevator surface.

5. Control apparatus for an aircraft having a roll and a pitch axis and an elevator control surface having a normal position for controlling the attitude of said craft about said pitch axis, said apparatus comprising: attitude sensing means for producing a control voltage signal in accordance with the extent of movement of the aircraft about the pitch axis; servo means adapted to displace said elevator and to produce a voltage signal in accordance with the extent of movement of said servo means; balanceable control means connected to the signal producing means and responsive to the difference of said voltage signals for operating said servo means to eliminate the difference voltage; means responsive to the acceleration of said craft along an axis perpendicular to the roll and pitch axes above a predetermined value for producing a voltage signal to said control means tending to decrease surface displacement; and further means responsive to the change in position of the center of gravity of said aircraft along said roll axis for producing a voltage signal to said control means to vary the extent of elevator displacement required to provide the predetermined acceleration.

6. Control apparatus for an aircraft having an elevator control surface, said apparatus comprising: attitude responsive means for producing a voltage variable in magnitude in accordance with the extent of change in pitch attitude of said aircraft; means for producing a voltage variable in magnitude in response to the increase in acceleration of said craft along an axis perpendicular to the roll and pitch axes; means for algebraically combining said voltages; voltage dividing means responsive to the change in the center of gravity in the direction of said roll axis and connected to the combining means for varying the output of said combining means for given pitch attitude and acceleration changes; servo means for producing a voltage variable in magnitude in accordance with its extent of movement; and balanceable control means responsive to said last named voltage and to said varied output voltage of said combining means for controlling said servo means.

7. Control apparatus for an aircraft having an elevator control surface, said apparatus comprising: pitch attitude responsive means producing a first control signal, pitch attitude selecting means producing a second control signal, aircraft normal acceleration responsive means producing a third control signal proportional to accelerations along the craft vertical axis, and pitch rate responsive means producing a fourth control signal; means for algebraically combining the first, second, third and fourth control signals, and further means adjusted in response to the position of the center of gravity to determine the effective value of this first combined control signal; airspeed responsive means producing a fifth control signal, means adjusted in accordance with the position of the center of gravity to produce a sixth control signal, and elevator deflection responsive means to produce a seventh control signal; means for combining said fifth, sixth and seventh control signals, further means adjusted in accordance with the airspeed to determine the effective value of this second combined control signal; and means for applying the first and second effective combined control signals to operate a servomotor to position the elevator so as to maintain stable flight at any selected pitch attitude and to maintain normal acceleration within chosen safe limits during any transient operation due to external influences or change in selected pitch attitude, at any airspeed or position of center of gravity of the aircraft.

8. Control apparatus for an aircraft having an elevator control surface having a normal position, said apparatus comprising: servo means including an attitude responsive gyroscope for operating said control surface about its normal position to maintain the craft in a selected attitude; aircraft center of gravity computing means for determining the center of gravity of said craft; first signal generating means controlled by said computing means and included in said servo means to effect operating thereof for varying the said normal position of said control surface; follow up signal generating means operated by the servo means having its signal opposed to that of the first signal generating means, whereby change in the control surface normal position with change in the position of the center of gravity of the craft is effected to prevent normal acceleration of said craft due to change in position of the center of gravity thereof.

9. Control apparatus for an aircraft comprising means for deriving a first signal voltage variable in phase and magnitude with the change in the position of the center of gravity of said aircraft longitudinally thereof; means for deriving a second signal voltage only variable in magnitude with changes in airspeed of said aircraft but arranged to provide the same signal voltage at two different airspeeds; means connected to the two signal deriving means for combining said two signals; and means connected to and operated by said combining means for altering the normal position of an elevator control surface of said craft in accordance with the center of gravity position and air speed, to maintain the craft at a load factor of unity.

10. Control apparatus for an aircraft having an elevator control surface, said apparatus comprising: a gyroscope for detecting movement of said craft about its pitch axis; control means connected between said gyroscope and said elevator control surface and controlled by the gyroscope to operate the elevator from a normal position for maintaining a predetermined flight attitude of said craft; attitude selecting means included in said control means and effecting operation of the elevator for changing the normal relative position of said gyroscope and said elevator control surface; and further means included in such control means and responsive to the change in the position of the center of gravity of said aircraft in the direction of its longitudinal axis, for modifying further the normal position of said elevator control surface relative to the gyroscope whereby to maintain substantially constant the acceleration force normal to said craft in the direction of its vertical axis.

11. Control apparatus for an aircraft having an elevator control surface, said apparatus comprising: craft attitude sensing means for producing a signal voltage variable in magnitude in accordance with the extent of tilt about one axis of the said craft; servomotor means adapted to position an elevator control surface and to produce a signal voltage opposing the tilt voltage in accordance with the extent of movement of said servo means while positioning the surface; combining means responsive to the sum of selected amounts of the two opposing voltages and connected to the servomotor for proportionally controlling said servomotor means; means in said combining means and responsive to the speed of said aircraft for modifying the relative magnitudes of the selected amounts of said voltages controlling said servomotor for varying the extent of movement of said servo means for a given tilt of said attitude sensing means; and further means in said combining means responsive to the change in position of the center of gravity of said aircraft longitudinally thereof for additionally modifying the relative magnitudes of the selected amounts of said voltages for changing the extent of movement of said servomotor means for a given tilt of said attitude means.

12. Control apparatus for an aircraft having an elevator control surface, said apparatus comprising: craft attitude sensing means responsive to tilt about one axis for producing a voltage having a magnitude in accordance with the extent of tilt; center of gravity computer means responsive to the position of the center of gravity of said aircraft longitudinally of the craft; ratio means operated by said computer means for modifying the voltage produced for any given extent of tilt; servo means adapted to operate said control surface and to produce a rebalance voltage in accordance with the extent of movement of said servo means; and balanceable means adapted for combining said modified and rebalance voltages and connected to said servo means and controlling the extent of operation of said servo means in accordance with the relative values of said voltages to vary in accordance with change in the center of gravity position, the extent of surface operation for a given extent of tilt.

References Cited in the file of this patent

UNITED STATES PATENTS

| | | |
|---|---|---|
| 1,885,578 | Boykow | Nov. 1, 1932 |
| 2,188,834 | Fischel et al. | Jan. 30, 1940 |
| 2,190,390 | Thiry | Feb. 13, 1940 |
| 2,381,840 | Schaefer et al. | Aug. 7, 1945 |
| 2,387,795 | Isserstedt | Oct. 30, 1945 |
| 2,443,098 | Dean | June 8, 1948 |
| 2,452,311 | Markusen | Oct. 26, 1948 |
| 2,464,629 | Young | Mar. 15, 1949 |
| 2,511,846 | Halpert | June 20, 1950 |
| 2,516,142 | Nissen | July 25, 1950 |
| 2,553,560 | Esval | May 22, 1951 |